March 29, 1966   J. V. KELLY ET AL   3,243,153
ADJUSTABLE CLAMP

Filed Aug. 28, 1964   2 Sheets-Sheet 1

INVENTORS
JOHN V. KELLY
FRANK D. NIGRO

BY   Claude Funkhouser
ATTORNEY

March 29, 1966   J. V. KELLY ET AL   3,243,153
ADJUSTABLE CLAMP
Filed Aug. 28, 1964   2 Sheets-Sheet 2
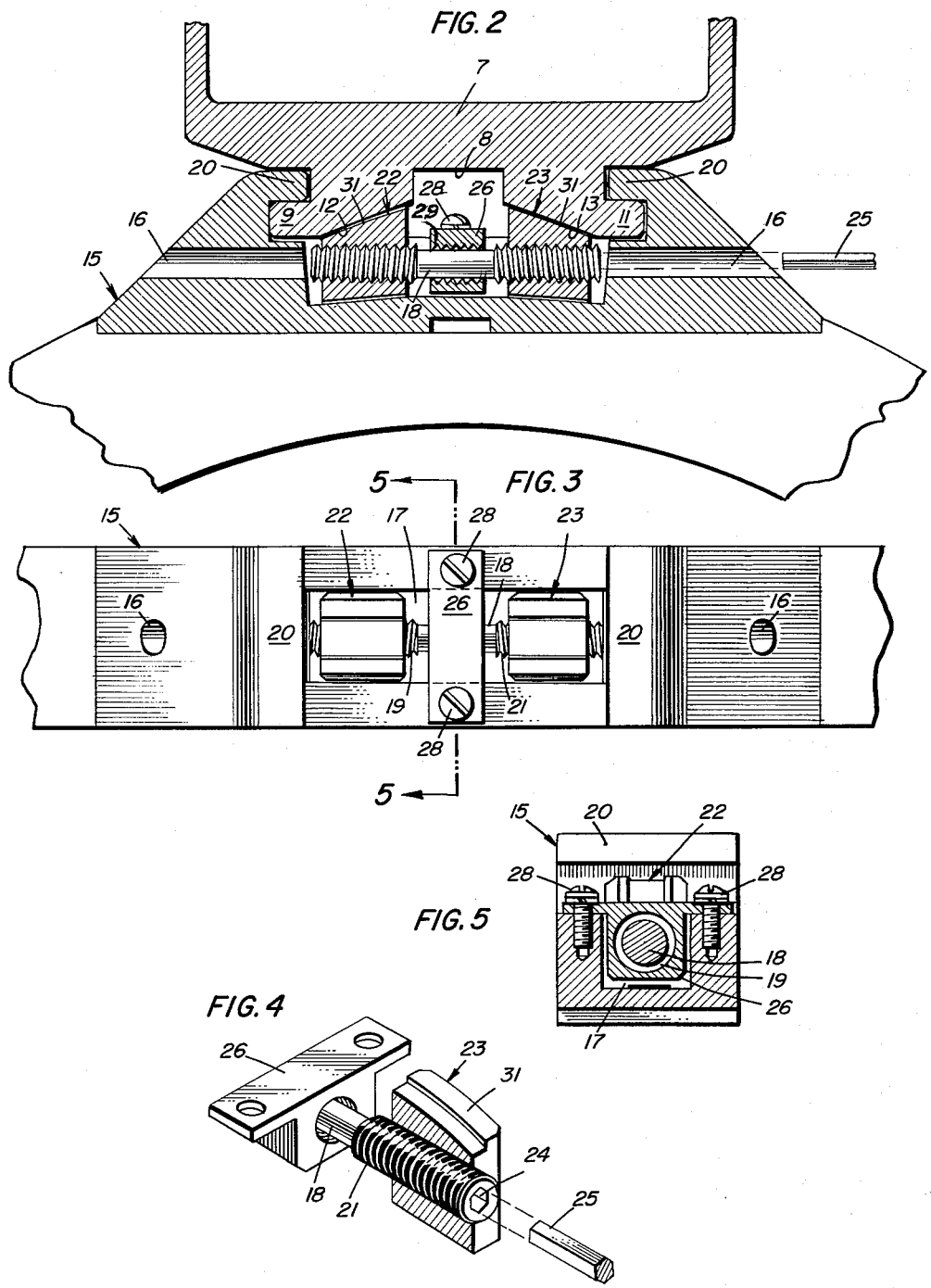

United States Patent Office 3,243,153
Patented Mar. 29, 1966

3,243,153
ADJUSTABLE CLAMP
John V. Kelly, Framingham, and Frank D. Nigro, Arlington, Mass., assignors to the United States of America as represented by the Secretary of the Navy
Filed Aug. 28, 1964, Ser. No. 392,976
1 Claim. (Cl. 248—226)

This invention relates to a special type clamp designed for a particular use.

In the making of clamps to attach radar receiver pods to aircraft there are qualifications which must be satisfied. These qualifications are that the clamp must fit the existing rail without any modification of the rail; should be capable of being quickly and easily applied, and once applied should be able to withstand vibration without loosening; should withstand both acceleration and deceleration loads without developing high areas of stress in the supporting structure; should be easily assembled, together with the radar receiver pod which it is supporting; should be positive in its locking operation; and should be capable of being constantly applied and removed without marring the structure to which it is applied.

The object of this invention is to provide a clamp designed to fit the launching rail of an existing missile launcher carried on an aircraft.

A further object of this invention is to provide a clamp which will fit the launcher rail of an existing missile launcher without marring or otherwise defacing or rendering the rail unfit for use as a launcher rail, and which may be applied and removed from the rail any number of times without in any way detracting from the efficiency of the rail as a launcher unit.

It is a further object of the present invention to provide a clamp having no loose parts which could be misplaced or lost, and which may be locked in place with no preparation of the structure to which it is attached.

It is a still further object of the present invention to provide a clamp having a double wedge engaging angled surfaces of a launcher rail in such a manner as to prevent jamming of the wedge in place in the securing operation.

Other objects, advantages and novel features of the invention will become apparent from the following detailed description of the invention when considered in conjunction with the accompanying drawings wherein:

FIG. 2 is a cross-sectional view of the clamp in position on the rail with the supporting pod partially shown in outline form;

FIG. 3 is a top plan view of the clamp;

FIG. 4 is a detailed view of one of the wedges and its operating screw;

FIG. 5 is a cross-section on line 5—5 of FIG. 3.

Figure 1:
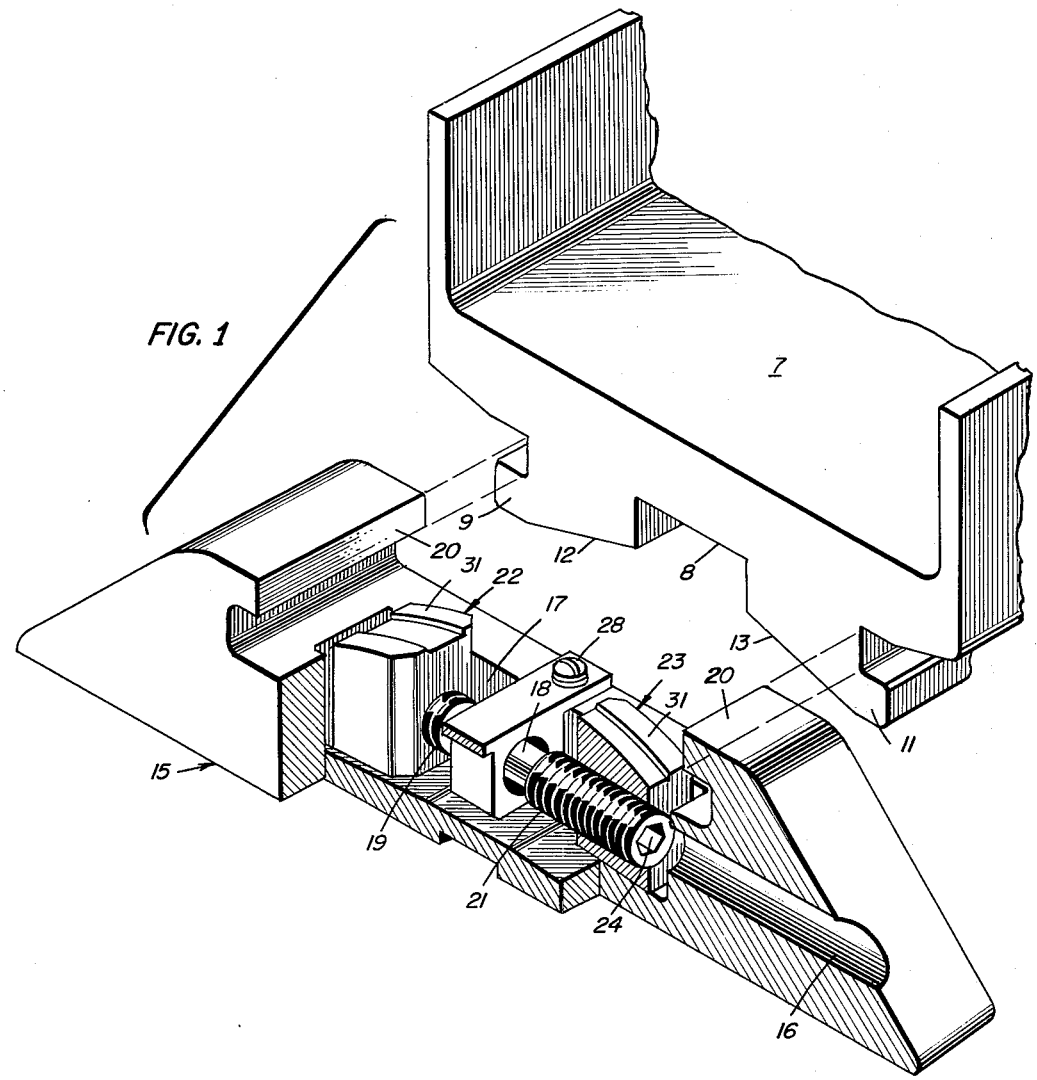
FIG. 1 is a perspective view, partly in section showing the clamp about to be fitted to the supporting rail.

A missile launcher rail 7 carried on the F4H aircraft far launching a Sparrow III missile is illustrated in FIG. 1. This rail is formed with a track located on the underside of the rail. The track has a central longitudinal recess 8 and two longitudinal edge flanges 9 and 11 respectively. Between the flange 9 and the recess 8 a plane surface 12 slopes downward from the recess to the flange. Likewise, a similar surface 13 extends from the recess 8 to the flange 11.

The clamp to which a radar receiver pod 14 is attached has a body portion 15 formed with a bore 16 and an enlarged central recess 17 communicating with the bore. The body of the clamp is formed with transverse, opposed flanges 20 for engagement with the longitudinal recesses 9 and 11 of the rail. The enlarged central portion 17 houses a screw thread of the turnbuckle type having a central unthreaded portion 18 and two end portions 19 and 21 oppositely threaded. The end portion 19 carries a wedge 22 and the end portion 21 carries a wedge 23. The top surfaces of the wedges 19 and 21 are curved as at 31 so that wedging contact between the sloping surfaces 12 and 13 and the top of the wedges is line contact only. This prevents binding and gives quick release when the clamps are released. The exposed ends of the screws are internally formed with Allen wrench sockets 24 for the reception of an Allen wrench 25. Turning of the screw from either side will move the wedges in opposite directions. A central loose fitting threaded bushing 26 holds the screw and its wedges in place when the clamp is not on the rail. This bushing is threaded at 29 to permit the screw and bushing to be assembled, yet it insures again loss of the screw when the clamp is removed from the rail. The bore is in line with the ends of the screw and gives access to the Allen wrench to adjust the clamp. The bushing is held in place by screws 28, threaded into the body portion of the clamp.

The clamp is attached to the radar receiver pod and slipped over the end of the rail. At this time the wedges are so adjusted that the fit of the clamp on the rail is loose. Once in place the screw 20 is turned using either end for the insertion of the wrench. Turning of the screw draws the wedges outward bringing their sloping surfaces into contact with the sloping surfaces of the track, which wedges the clamp securely in place.

The clamp fits loosely over the edge flanges of the rail until the screw is turned. It then becomes one with the rail, without the slightest vibration between the clamp and the rail and yet it may be easily loosened to remove. The wedges are at such an angle that they do not tighten so that they are hard to release, and so that the angle of the slope of the wedges and the sloping surface of the rail makes a locking device unnecessary.

Obviously many modifications and variations of the present invention are possible in the light of the above teachings. It is therefore to be understood that within the scope of the appended claim the invention may be practiced otherwise than as specifically described.

What is claimed is:

In a missile launching system, the combination of a launching rail formed with longitudinal edge flanges and angled surfaces sloping downward from the longitudinal center to the flanges with a clamp for a radar receiver pod, comprising:

a body portion of the clamp formed with transverse recesses engaging the flanges of the rail, said body being further formed with a central longitudinal bore and a central recess in communication with said bore;

a screw formed with oppositely threaded ends mounted in said central recess; and a pair of wedge blocks formed with a flat bottom surface and an arcuate upper surface, each of said blocks being threadedly mounted on opposite ends of the screw and adapted to be moved in opposite directions by rotation of said screw, the bottom surface of the blocks sliding on the bottom of the central recess, the arcuate upper surface of each of the blocks making line contact with the respective angled surface of the rail securely clamping the side of the transverse recesses onto the longitudinal edge flanges of the rail, said wedge blocks being instantly releasable by initial releasing movement of the screw.

References Cited by the Examiner

UNITED STATES PATENTS

| | | | |
|---|---|---|---|
| 808,648 | 1/1906 | Fischer | 238—327 |
| 2,532,046 | 11/1950 | Walter | 29—1 |
| 3,111,912 | 11/1963 | Keiter | 105—141 |

CLAUDE A. LE ROY, *Primary Examiner.*

J. F. FOSS, *Assistant Examiner.*